June 8, 1948. O. BLYHOLDER 2,442,947
CODE-CALL SYSTEM
Filed Jan. 24, 1944 7 Sheets-Sheet 3
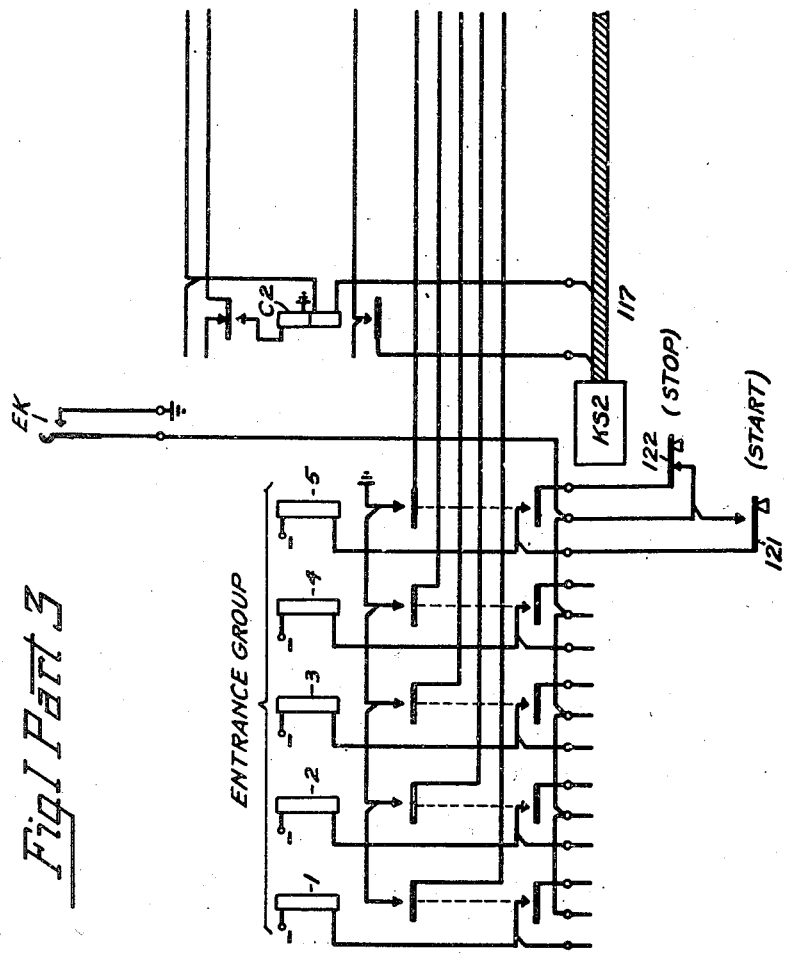
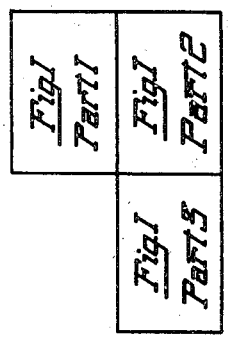
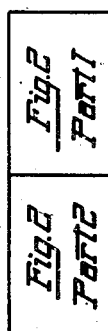
Inventor:
Orlando Blyholder,
By C. P. Soper
Atty.

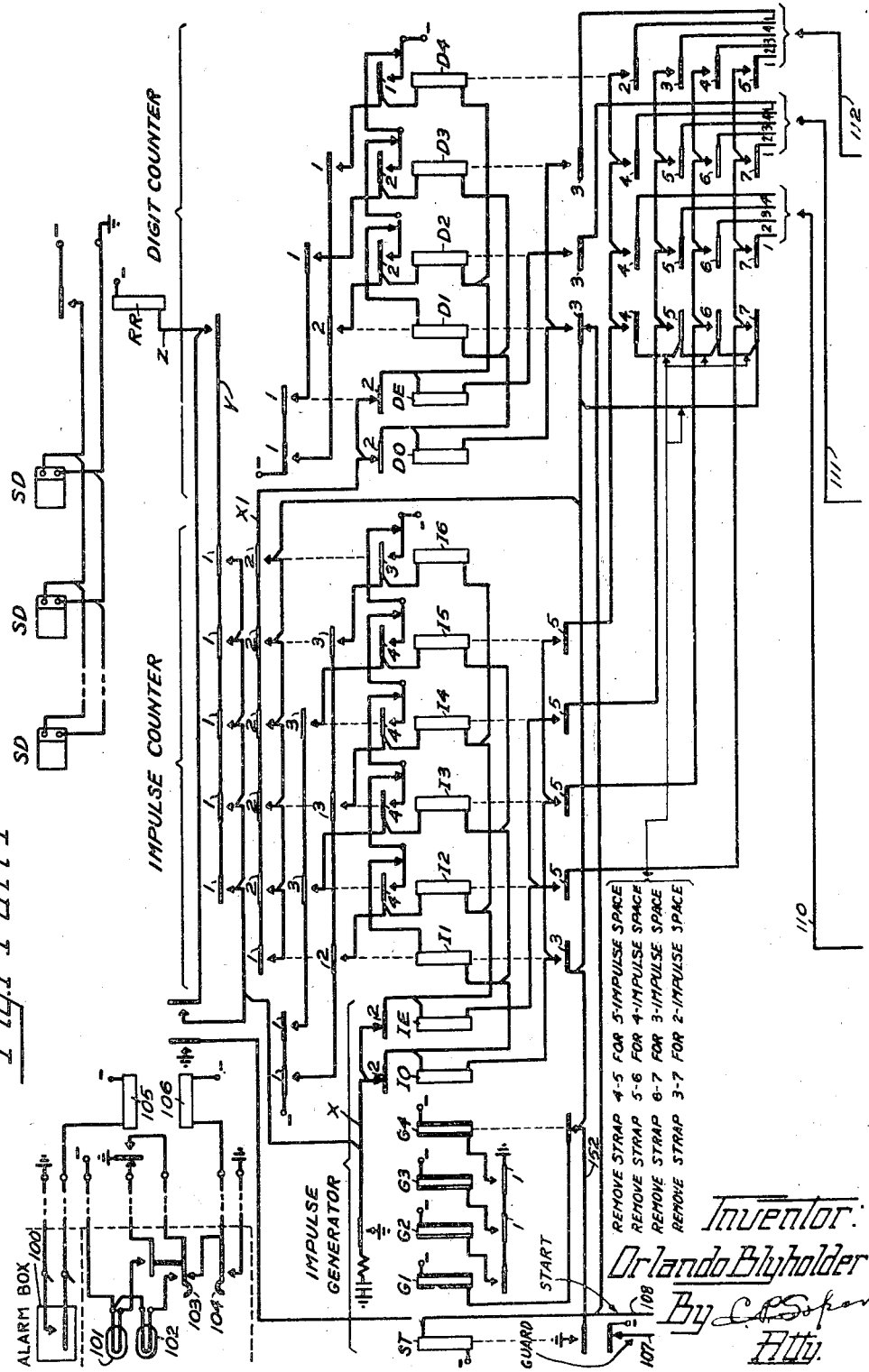

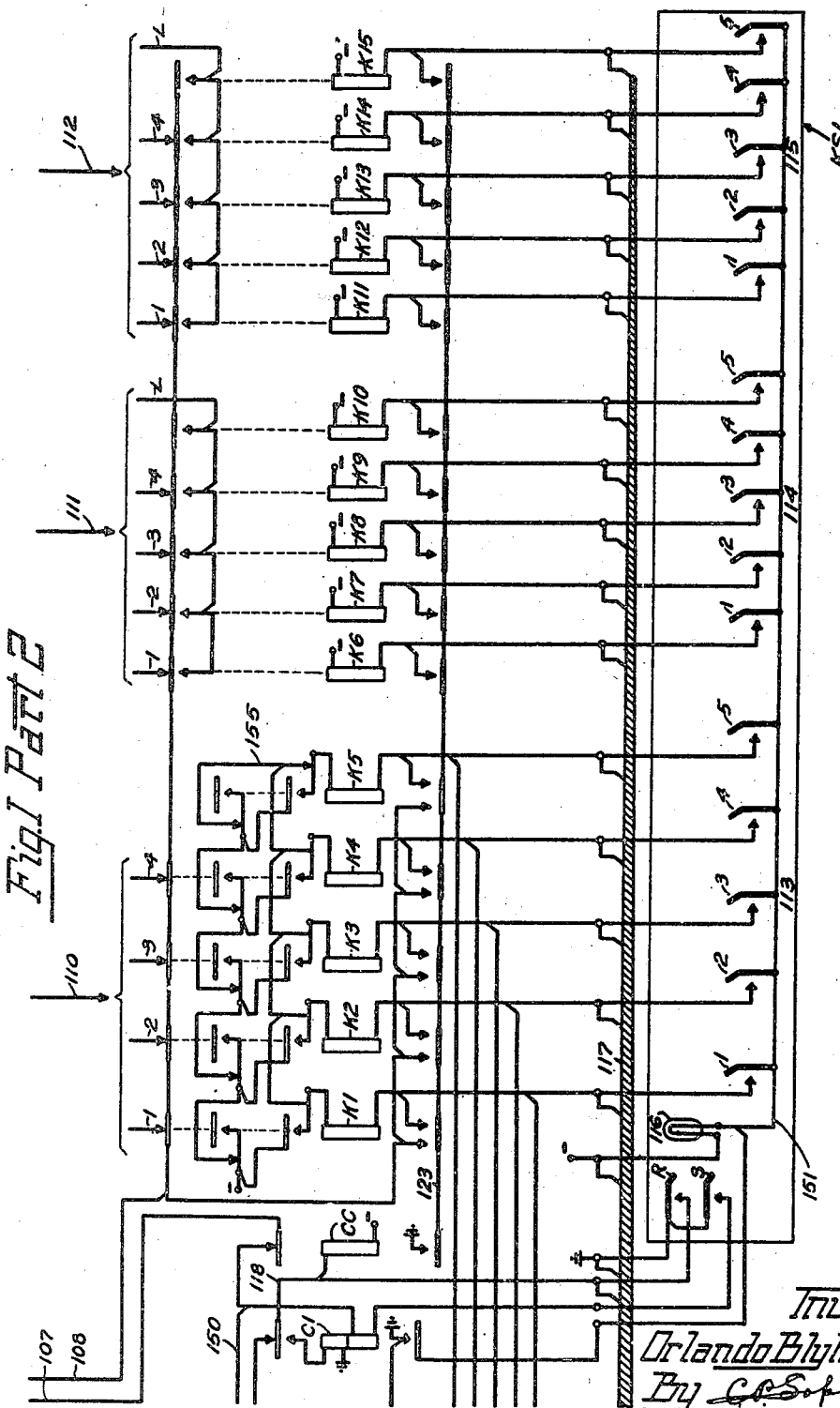

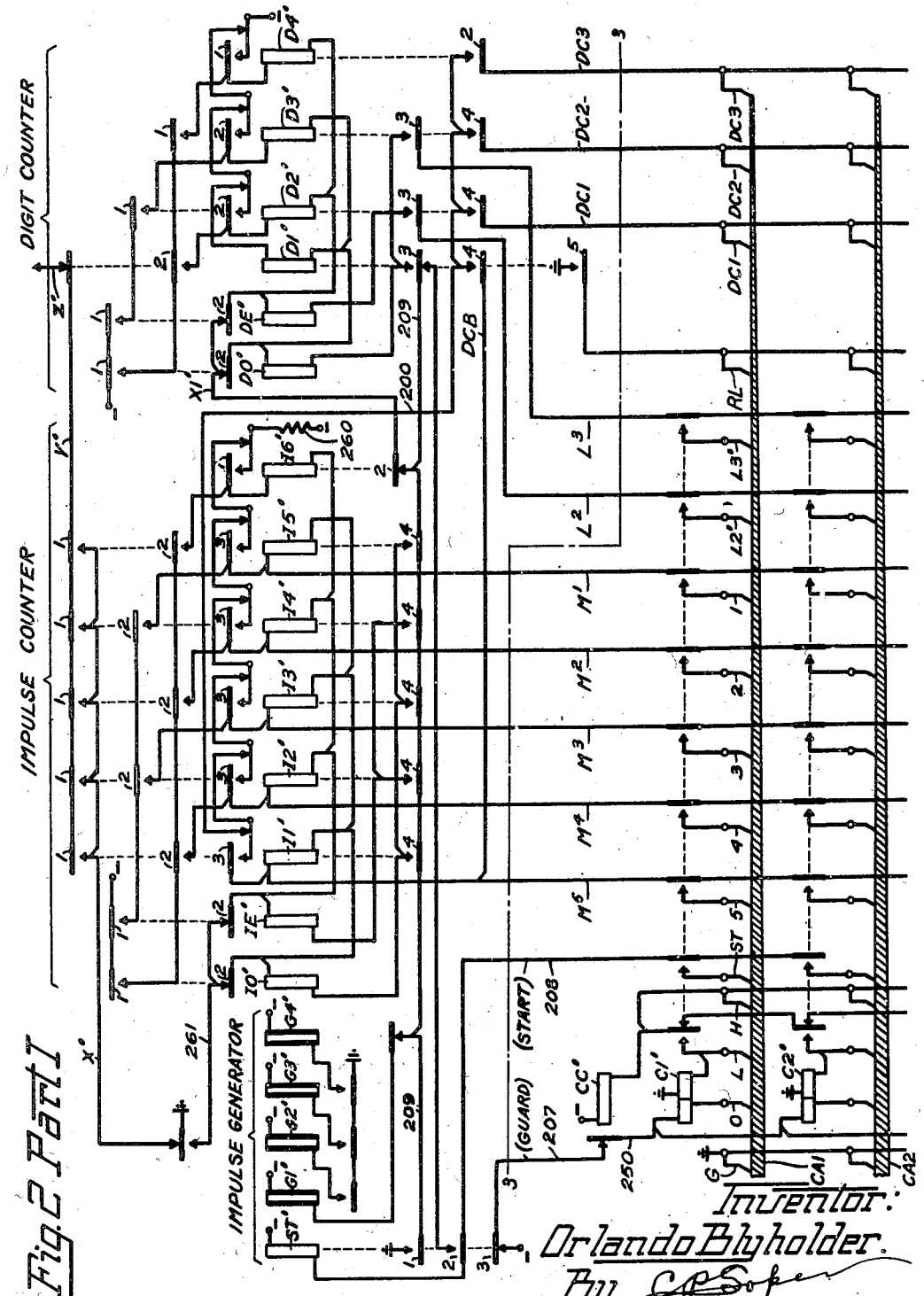

June 8, 1948.  O. BLYHOLDER  2,442,947
CODE-CALL SYSTEM
Filed Jan. 24, 1944  7 Sheets—Sheet 5
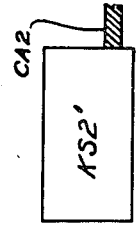
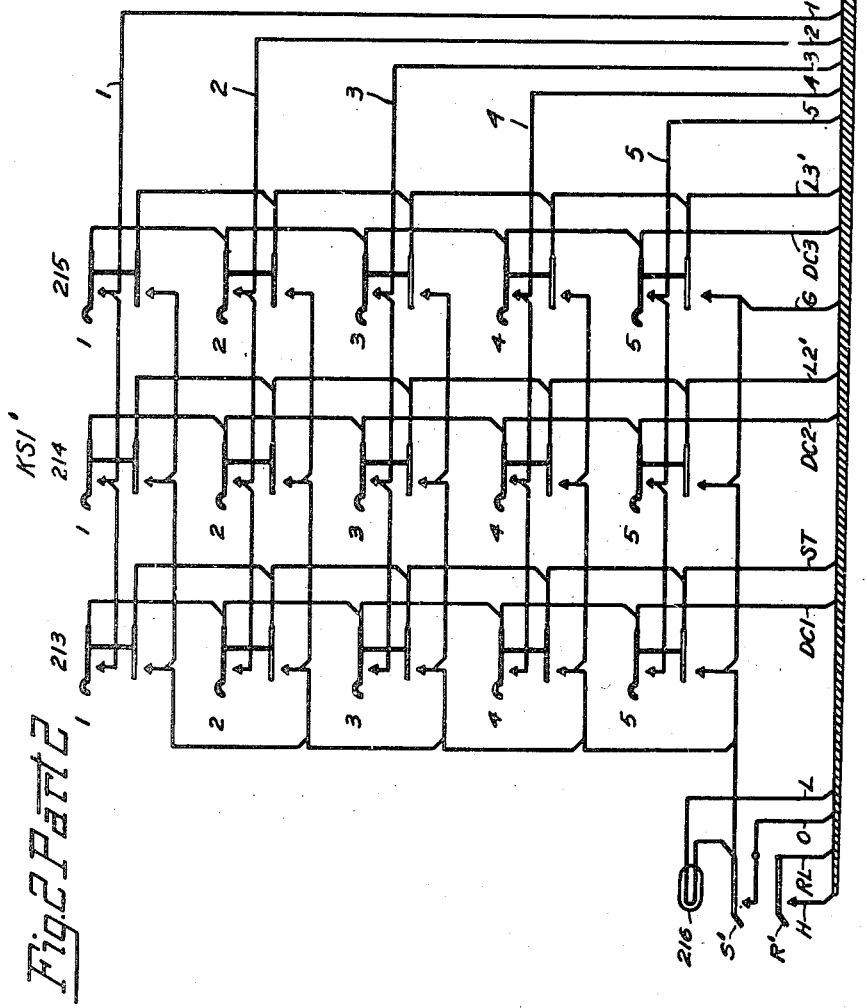
Fig.2 Part 2
Inventor:
Orlando Blyholder.
By C.P.Soh
Atty

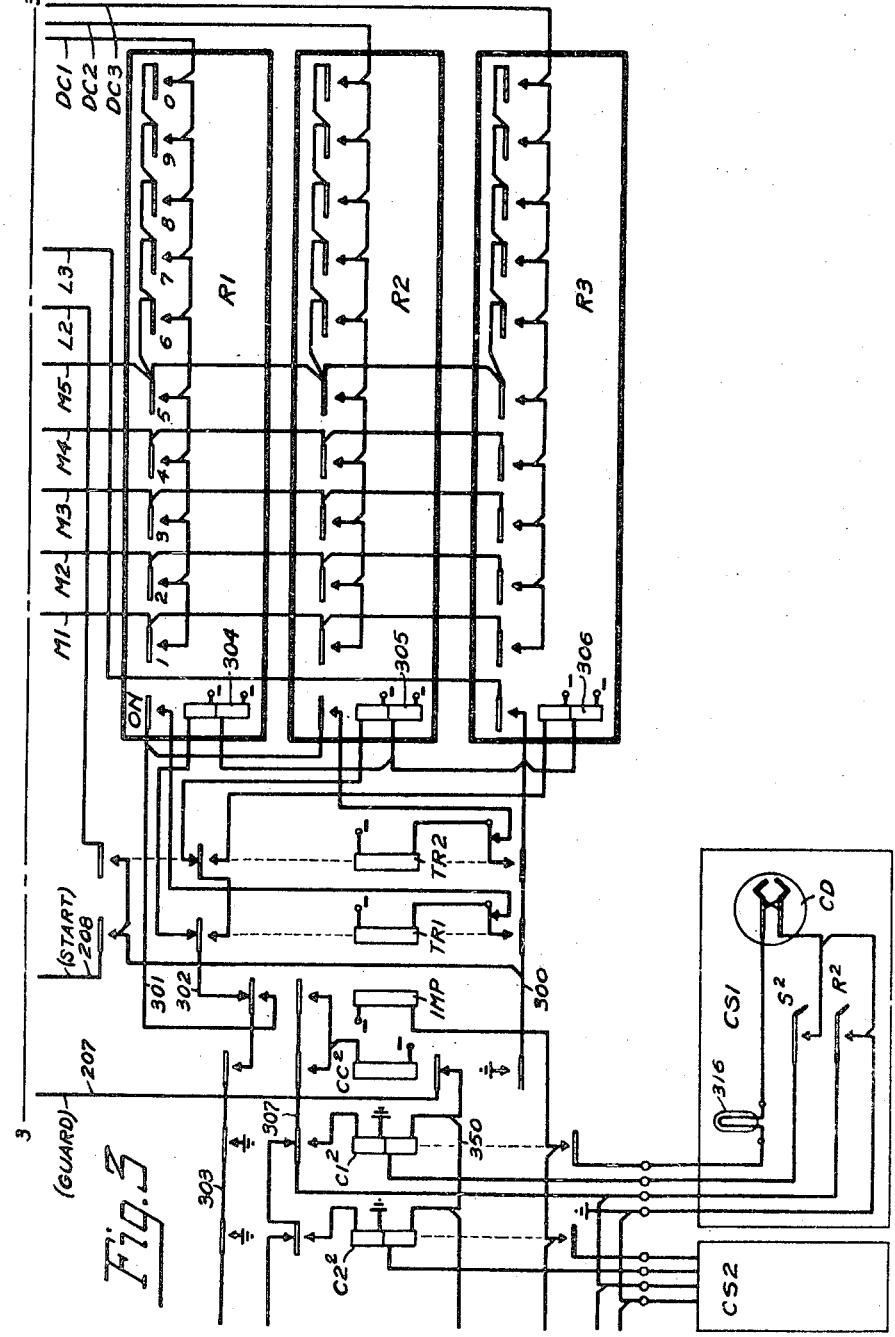

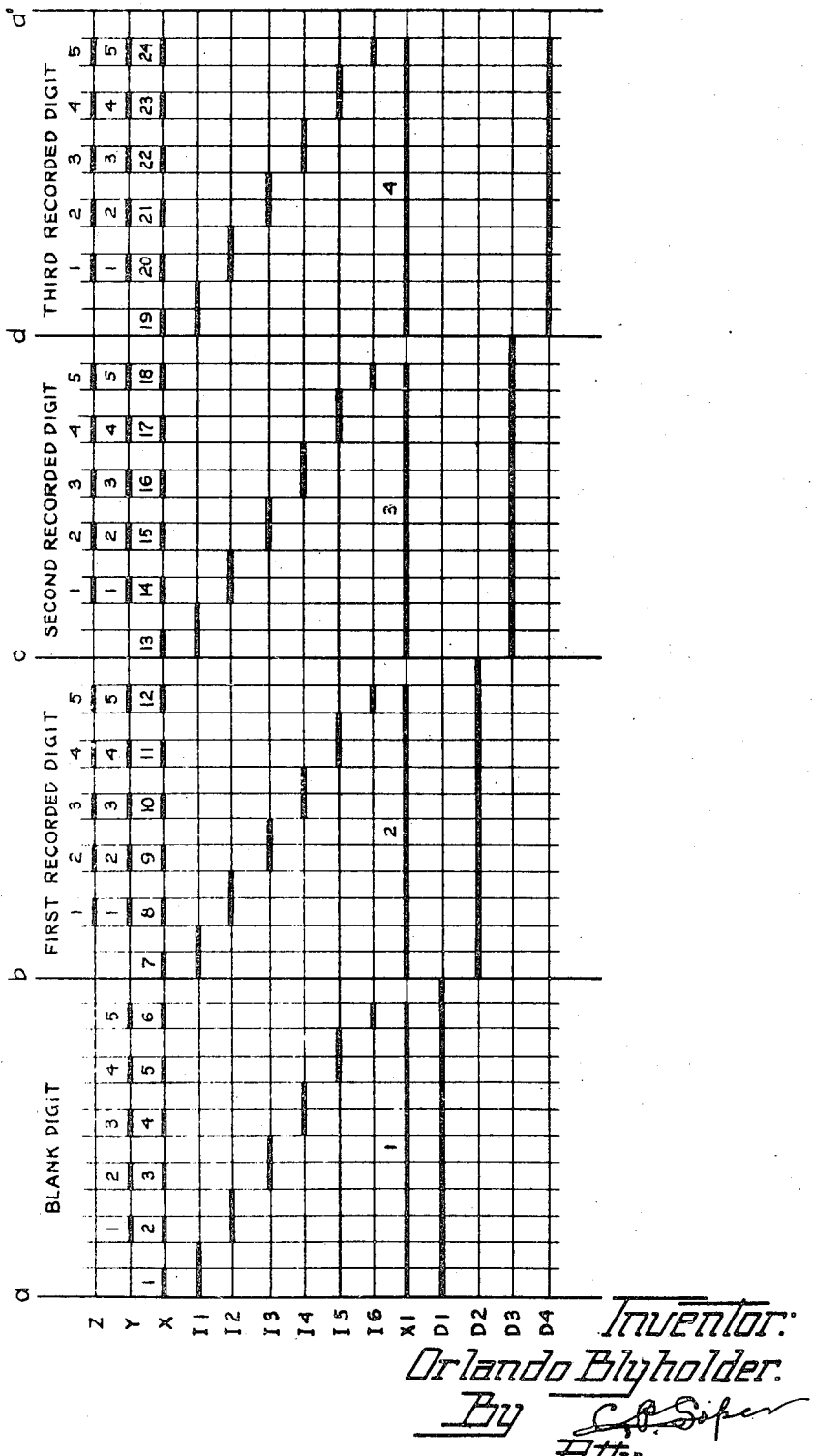

Patented June 8, 1948

2,442,947

UNITED STATES PATENT OFFICE 2,442,947

CODE-CALL SYSTEM

Orlando Blyholder, Chicago, Ill., assignor to Kellogg Switchboard and Supply Company, Chicago, Ill., a corporation of Illinois Application January 24, 1944, Serial No. 519,550

12 Claims. (Cl. 177—380)

This invention relates to code-call systems such as are used in industrial establishments, or the like, to page designated persons who may be away from their desks, offices, or stations.

GENERAL DESCRIPTION

In a code-call system of the type under consideration, a register-sender transmits impulses, over a common signalling line to appropriately located signalling devices, according to preassigned code numbers.

The main object of the invention is the provision of a code-call system of the general type outlined above which is reliable in operation and economical to manufacture.

A specific object of the invention is to provide a code-call system of the foregoing type in which the register-sender transmits code numbers containing a variable number of code digits, each of which has a variable value, in which the interdigit spacing is independent of the number of impulses in the concerned digits, and in which the internumber spacing is independent of the number of digits and the respective values thereof.

A further specific object is to provide a code-call system of the foregoing type in which the register-sender comprises a group of suitably interconnected relays.

A still further specific object is to provide a system in which a number of control stations may be used without mutual interference.

Features of the invention are that (1) an impulse counter (consisting of a group of counting relays) counts the impulses of any transmitted digit, being used over and over for this purpose; (2) a digit counter (a group of relays) is controlled by the impulse counter to count the transmitted digits, associating the impulse counter each time with the next successive register portion; (3) the impulse counter introduces a uniform interdigit space by counting an untransmitted impulse on each digit cycle of operations; (4) the digit counter introduces a uniform internumber space by causing the impulse counter to perform a blank digit cycle of operations between numbers, during which no impulses are transmitted to the signal line; (5) an alarm signal, controllable from a fire alarm box (for example) and from an alarm key, takes precedence over any other signal being transmitted; and (6) the system may be operated when desired to inform a watchman or other person on the premises of the location of an entrance at which a push button has been actuated.

A special feature of the invention is that the relays of the impulse counter comprise only those necessary to the impulse-counting operation, and the relays of the digit counter comprise only those necessary to the digit-counting operation, the counting relays of these devices performing all switching operations necessary to secure the transmission of the recorded number of digits of the respective values recorded.

A further special feature is that, while the termination of the number-transmitting operation is under the control of the operator, the terminating act, whenever performed, is automatically nullified until any number being currently transmitted has been fully transmitted, whereby the act of termination does not abbreviate such number.

Other objects and features of the invention will become more apparent upon a further perusal of the specification in connection with the accompanying drawings, comprising Figs. 1 to 5.

Fig. 1, parts 1 to 3, shows a first embodiment of the invention, wherein non-locking control keys are provided and the key operations are registered on relays;

Fig. 2, parts 1 and 2, shows a second embodiment of the invention, wherein locking-type control keys are employed, rendering the use of register relays unnecessary, and wherein modified circuit arrangements are employed to control the impulse counter;

Fig. 3 shows a modification of the register-portion of Fig. 2, the locking key set being replaced by a telephone type calling device and suitable registers;

Fig. 4 is a chart giving the time of operation and release of the counting relays of the impulse and digit counters of Fig. 1 with respect to generated and transmitted impulses;

Fig. 5 shows how the sheets on which Fig. 1 are drawn should be assembled; and

Fig. 6 shows how the sheets on which Fig. 2 are drawn should be assembled.

APPARATUS OF FIGURE 1

The apparatus of Fig. 1 includes a key set illustrated diagrammatically at KS1 and a duplicate key set indicated by the rectangle at KS2. Key set KS1 includes a signal lamp 116 and several non-locking keys, or push buttons. These keys include start key S, release key R, and three sets of digit keys 113 to 115. This key set is interconnected with the remaining equipment of the system by conductors which may be in cable form, as indicated at 117 for the interconnection with the duplicate key set KS2.

The recording relays K1 to K15 are associated respectively with the fifteen digit keys of either key set.

Chain-control relay CC is common to the two key sets, and is interconnected with chain relays C1 and C2, individual respectively to the key sets KS1 and KS2. For each additional key set desired, an additional relay similar to C1 and C2 may be provided.

The control relays shown in part 1 of Fig. 1 include the start relay ST; relays G1 to G4, interconnected to serve as an impulse generator; relays I0, IE, and I1 to I6, interconnected to serve as an impulse counter; relays DO, DE, and D1 to D4, interconnected to serve as a digit counter; and repeating relay RR, which repeats impulses to the common signalling line having signal devices such as SD connected thereto.

Relays 1 to 5, part 3 of Fig. 1, comprise the entrance group. Each relay may be associated with a different entrance at which there is an outside start push button such as 121 to be controlled by the visitor and an inside stop button 122 to be controlled by the person admitting the visitor.

The equipment in the upper left-hand corner of Fig. 1, part 1, is alarm control equipment, comprising contact, signal, and relay devices 100 to 106.

APPARATUS OF FIGURE 2

The apparatus of Fig. 2 includes a key set illustrated diagrammatically at KS1', and a duplicate key set indicated at KS2'. Key set KS1' includes a signal lamp 216, non-locking start and release keys S' and R', and three sets of locking digit keys 213 to 215. Since the digit keys of KS1' are of the locking type, they may be used to retain the record of the digit information set up thereon, whereby recording relays similar to K1 to K15 of Fig. 1 are not necessary in the arrangement of Fig. 2.

Relays CC', C1', and C2' are similar in function to the corresponding relays of Fig. 1.

The relays shown above the broken line 3—3 extending across part 1 of Fig. 2 correspond in function to the similarly designated relays of Fig. 1, except for modifications which will be brought out in the detailed description to follow.

APPARATUS OF FIGURE 3

Fig. 3 shows a modification of the apparatus of Fig. 2 shown below broken line 3—3 extending across part 1 thereof.

In Fig. 3, key sets KS1' and KS2' are replaced by the control stations illustrated diagrammatically at CS1, and the similar station indicated at CS2. The equipment at control station CS1 includes the calling device CD, which may be a sender of the dial-controlled type commonly used at automatic telephone substations. The non-locking start and release keys R² and S² correspond respectively to the keys R' and S' of Fig. 2; and the signal lamp 316 corresponds to the lamp 216 of Fig. 2.

Relays CC², C1², and C2² correspond respectively in general function to relay CC', C1', and C2' of Fig. 2.

The remaining apparatus of Fig. 3 constitutes equipment responsive to trains of impulses transmitted from either control station. Registers R1 to R3 are provided to record such trains of impulses. Each such register may comprise a magnetic impulse counter of the type illustrated in Figs. 21 to 25 of the co-pending application of John I. Bellamy, Serial No. 493,312, filed July 2, 1943.

Relays IMP, TR1, and TR2 comprise an impulse relay and two transfer relays interposed between the calling device of a connected one of the control stations and the registers R1 to R3, for control purposes, to be later described.

DETAILED DESCRIPTION

I. FIGURE 1

IA. *Calling No. 555*

A detailed description of the operation of the system as shown in Fig. 1 will now be given. For this purpose, it will be assumed that the operator at key set KS1 desires to transmit call No. 555, being a call number having the maximum number of digits (3), each digit being represented by the maximum number of impulses (5).

IA1. *Individualizing the system with key set KS1*

The system must first be individualized with the key set, KS1. To this end, the start key S is actuated and held until lamp 116 lights as a signal that the system has become individualized as desired.

When the system is not in use, the ungrounded (—) pole of the common current source is connected through the lower contacts of start relay ST, guard conductor 107, and contacts of chain-control relay CC, to conductor 150, whereby actuation of start key S (whose movable contact is grounded) energizes the lower winding of chain relay C1. Relay C1 thereupon operates, and closes a self-locking circuit, including its own upper winding and the winding of chain-control relay CC. Relay CC thereupon operates, and removes operating potential from conductor 150, thereby rendering ineffective the start keys S at all key sets. The initial operating circuit of relay C1 (through its lower winding) is now open, but relay C1 remains operated in its self-locking circuit through its upper winding and the winding of the operated relay CC. It is to be noted that conductor 118, over which the upper winding of any one of the relays C1, C2, and so forth, may become locked operated is carried through the chain circuit whereby only one such relay can be in a locked, operated condition at the same time, thereby preventing the simultaneous individualization of the system with two key sets.

At its lower contacts, relay C1 grounds conductor 151, thereby rendering effective the normally ineffective digit keys in key set KS1, and lighting signal lamp 116.

Upon noting the lighted condition of signal lamp 116, the operator may release the start key S and proceed to actuate the digit keys of key set KS1 according to the number to be called.

IA2. *Recording call No. 555*

In the assumed example, the number to be called is 555. Accordingly, key 5 of set 113 is momentarily actuated, followed by the momentary actuation of the keys 5 in sets 114 and 115.

When key 5 of set 113 is momentarily actuated, key relay K5 operates from ground on conductor 151 and locks to conductor 123, grounded at the lower contacts of the operated chain-control relay CC. This locking circuit is closed at the right front contact of the lower armature of relay K5. At the left front contact of the lower armature of key K5, ground potential is extended to start conductor 108, thereby starting the sending apparatus into operation, as will be subsequently described.

Additionally since none of the relays K1 to K4 is operated, the grounding of start conductor 108 results in the grounding of each of the normally connected first-digit control conductors 1 to 4 in group 110, thereby recording the fact that the first recorded digit is "5."

When relay K10 responds to the momentary actuation of key 5 of group 114, it closes a self-locking circuit to conductor 123 at its lower contacts, while at its upper contacts it extends ground potential to conductor L of the second digit group 111, as an indication that a second digit has been recorded. Since none of the relays K6 to K9 is operated, digit conductors 1 to 4 of this group remain connected to the now-grounded start conductor 108, indicating that the second recorded digit is a "5."

When key 5 of group 115 is momentarliy operated to secure the recordation of the third digit 5 in the called number 555, relay K15 operates and locks to conductor 123, at the same time grounding conductor L of digit group 112 as an indication that a third digit has been recorded. With none of the relays K11 to K14 operated, conductors 1 to 4 in the third digit group 112 remain connected to the now-grounded start conductor 108, indicating that the third recorded digit is a "5."

IA3. *Locking start relay ST*

Start relay ST operates responsive to the grounding of start conductor 108, thereby placing ground potential directly on conductor 152, normally connected with start conductor 108 through the back contact of armature 3 of relay D1 of the digit counter. Relay ST is thereby locked operated, and can be restored only during such time as relay D1 is in operated condition, the utility of which will be subsequently explained. Relay ST also removes actuating potential from guard conductor 107, insuring that conductor 150 cannot be reenergized with actuating potential until start relay ST is unlocked and restored.

IA4. *Starting the impulse generator*

The impulse generator, comprising relays G1 to G4, is started into operation responsive to the grounding of conductor 152. When this occurs, relay G1 operates through contacts of relay G4, following which relays G2, G3, and G4 operate in succession, the circuit of each such relay being closed at contacts of the preceding relay. When relay G4 operates, it open-circuits and restores relay G1, whereupon relays G2, G3, and G4 restore successively, and relay G4 reconnects relay G1.

The above cycle of operations is repeated continuously so long as conductor 152 remains grounded.

Each of the relays G1 to G4 is a fast-operating relay, but is rendered slow-restoring, as by the usual copper sleeve arrangement intended to be indicated by the vertical lines drawn slightly inside the confines of the relay structure. Good results are obtained when a cycle of the impulse generator occupies a time interval of about one second, each of the relays G1 to G4 then requiring about one-quarter second to restore after its circuit is opened.

Relay G2 is the impulse-delivery relay. It grounds impulse conductor X on operating, and maintains this conductor grounded for about half a second, the time required for relays G3 and G4 to operate and relays G1 and G2 to restore.

IA5. *Transmitting the initial digit blank*

The sending apparatus is arranged to transmit a blank digit (no impulses on the signal line) preliminarily to each number transmission. The utility of this arrangement is twofold. It provides a spacing between numbers long enough to mark a clear distinction between the end of one transmitted number and the beginning of the next, and it permits ample time for the previously described digit-key and recording-relay operations to become completed before the transmission of the first digit of the first number is begun, avoiding the necessity of the operator hurrying through the second and third keying operations.

The placing of the first ground impulse on conductor X by relay G2 of the impulse counter results in the closure of a circuit through contacts 2 of odd-control relay I0 of the impulse counter, the winding of the first impulse relay I1, and the chain contacts controlled by armatures 4 of relays I2 to I5, and armature 3 of relay I6, to the ungrounded pole of the current source. Relay I1 operates in this circuit and prepares at its contacts 2 a circuit for the second impulse relay I2, while at its contacts 3 it closes a self-locking circuit through the winding of relay I0. Relay I0 does not operate in this locking circuit for the time being, being short-circuited by the initial energizing path between conductor X and the lower terminal of relay I1.

When the first impulse on conductor X is terminated, relay I1 remains operated, and relay I0 operates, in the above-noted locking circuit. Relay I0 opens a point in the associated odd-impulse path at its contacts 2, while at its contacts 1 it closes a point in the associated even-relay operating path.

As a further result of the operation of relay I1, the grounded conductor 152 is extended through contacts 1 of relay I1 to conductor X1, extending to the digit counter, thereby operating the first counting relay D1 thereof in a circuit path similar to that above traced for relay I1 of the impulse counter. Among other things, relay D1 disconnects impulse conductor Y from impulse conductor Z, thereby insuring that no impulse will be transmitted from conductor X over conductors Y and Z to relay R during transmission of the initial digit blank now ensuing. Relay D1 also connects grounded conductor 152 to armature 5 of each of the impulse relays I2 to I5 of the impulse counter, thereby preparing self-locking circuits for each such relay to enable the initial digit blank to be completely transmitted.

Upon the second grounding of impulse conductor X by the impulse generator, the prepared circuit for the second counting relay I2 of the impulse counter is thereby closed, through contacts 2 of even-control relay IE, winding of relay I2, contacts 2 of relay I1, and contacts 1 of relay I0. At its armature 4, relay I2 first closes a self-locking circuit through the chain contacts of the succeeding counting relays, and then open-circuits and restores relays I1 and I0. Relay I2 also locks its lower terminal to ground, through the winding of relay IE, its own contacts 5, contacts 7 of the operated relay D1, and conductor 152. Relay IE does not operate for the time being, being short-circuited by the ground potential on conductor X.

When the second impulse is terminated the short circuit is thereby removed from relay IE. Relay I2 remains locked operated, and relay IE operates in the locking circuit of I2. Upon operating, relay IE opens a point in the associated even-impulse path at its contacts 2, and at contacts 1 it closes a point in the associated odd-relay operating path.

When the third impulse is placed on conductor X, relay I3 operates through contacts of the restored control relay I0, its own winding and contacts of the operated relays I2 and IE. It locks itself to the source of operating potential at its armature 4, and then open-circuits and restores the operated relays I2 and IE. Additionally, relay I3 at its contact 5 closes a self-locking circiut in series with the odd-control relay I0, to ground by way of contacts 6 of the relay DI and conductor 152.

At the end of the third impulse, relay I0 operates in the locking circuit of relay I3 with results as previously noted, including at this time the preparation of a circuit at its contacts 1 through contacts 3 of relay I3 for the fourth impulse relay I4.

Relays I4 and I5 operates responsive to the fourth and fifth impulses, respectively, as described for relays I2 and I3, each such relay, upon operating, restoring the preceding counting relay, along with the then operated one of the control relays I0 and IE.

At the termination of the fifth impulse on conductor X, the then operated relay I5 remains locked operated and control relay I0 again reoperates. Relays I0 and I5 are the only relays of the impulse counter then in operated condition.

When the sixth impulse is placed on conductor X, relay I6 is thereby operated, through contacts of the restored even-control relay IE, the winding of relay I6, contacts 3 of relay I5, and contacts 1 of the reoperated odd-control relay I0. At its armature 3, relay I6 locks itself directly to the operating-current source, and open-circuits and restores relays I5 and I0, leaving relay I6 the only operated relay of the impulse counter.

It is to be noted that relay I6 has no contacts corresponding to contacts 3 of relay I1 and contacts 5 of relays I2 to I5, wherefore relay I6 does not lock itself operated to ground, as is the case with each of the preceding counting relays. Accordingly, when the sixth impulse is terminated, relay I6 restores, thereby returning the impulse counter to its original normal condition.

The preliminary digit blank, having a length (about six seconds) equal to the time consumed by six cycles of operation of the impulse generator, has now been transmitted, and all of the relays of the impulse counter are in restored condition in readiness to reoperate as required for the transmission of the digits of the recorded call number.

IA6. *Operation of the digit counter*

From an operational standpoint, the digit counter (comprising odd and even control relays DO and DE, and counting relays DI to D4) resembles the impulse counter, differing incidentally in that it contains only four counting relays in the illustrated embodiment, whereas the impulse counter is illustrated as containing the previously described six counting relays I1 to I6.

As previously indicated, the digit counter is controlled over impulse conductor XI. A single impulse is delivered over conductor XI to the digit counter for each complete operation of the impulse counter. As previously noted, the impulse to the digit counter is begun upon the closure of contacts 1 of relay I2. This impulse is continued at contacts 2 of the succeeding counting relays I2 to I6 so long as any one of them is in operated condition, until the operation of the impulse counter is terminated, upon the restoration of the last counting relay thereof to operate.

Upon the initial grounding of conductor XI, relay DI of the digit counter operates as previously noted, through contacts 2 of relay DO, the winding of relay DI and the contact chain including normally closed contacts controlled by armatures 2 of relays D2 and D3, and armature 1 of relay D4. Relay DI locks itself operated through odd-control relay DO, which relay operates in the locking circuit of relay DI responsive to the ungrounding of conductor XI upon the termination of the transmission of the initial digit blank. Relay DO, besides disconnecting the associated odd-impulse branch from conductor XI at its contacts 2, places energizing potential on the associated even-relay operating conductor at its contacts 1.

When the impulse counter starts its second cycle of operations, during which it transmits the first digit of the recorded number, as will be subsequently explained, relay I1 thereof again grounds conductor XI, and this conductor is maintained continuously grounded at contacts of one or another of the succeeding relays of the impulse counter until such digit has been completely transmitted.

The second grounding of conductor XI results in the closure of an operating circuit, through conctacts 2 of even-control relay DE, the winding of relay D2, contacts 2 of relay DI, and contacts 1 of relay DO, for the second digit counting relay D2. Relay D2 locks operating potential on its upper terminal at its armature 2, and open-circuits and restores relays DI and DO.

Relay D2 also locks itself to ground through the even-control relay DE and its own contacts 3, provided locking conductor L of the second digit group 111 has been grounded, responsive to the operation of one or another of key relays K6 to K10 of the second digit group. In this event, when the first digit impulse transmission has been completed, and conductor XI is consequently again ungrounded, digit-counter relay D2 remains operated, and relay DE operates in the above-noted locking circuit thereof.

At the beginning of the transmission of the second recorded digit, conductor XI is again grounded, whereupon the operating circuit is closed, through contacts 2 of the restored relay DO, the winding of relay D3, and contacts 1 of the relays D2 and DE. Relay D3 thereupon operates, locking itself to the operate chain at its contacts 2, and open-circuiting and restoring relays D2 and DE. Then, when conductor XI is again ungrounded at the end of the transmission of the second recorded digit, and provided conductor L in the third digit group 112 is grounded (at the contacts of one or another of the relays K11 to K15) to indicate that a third digit has been recorded, relay D3 remains locked operated, and relay DO reoperates in the locking circuit, through contacts 3 of relay D3 and over the associated conductor L. It may be noted that relays D3 and DO are then the only relays of the digit counter in operated condition.

When the impulse counter starts its cycle of operation pursuant to the transmission of the third recorded digit, and consequently again grounds conductor XI, relay D4 of the digit counter is operated, through contacts 2 of the restored relay DE, the winding of relay D4, and contacts 1 of relays D3 and DO. Relay D4 thereupon locks itself directly to the source of operating current, at the same time open-circuiting and restoring relays D3 and DO, leaving relay D4 the only relay operated in the digit counter.

Like relay I6 of the impulse counter, relay D4 closes no self-locking circuit to ground potential. It accordingly restores upon the ungrounding of conductor XI at the completion of the transmission of the third recorded digit, bringing the digit counter back to its illustrated normal condition, in preparation for starting another number transmission consisting of a number-spacing digit blank, followed by the respective digits of the recorded number.

IA7. *Transmitting the first recorded digit 5*

The next impulse delivered to impulse conductor X by the impulse generator, following the described clearing out of the impulse counter at the end of the transmission of the preliminary number-spacing digit blank, results in the re-operation in the described manner of counting relay II of the impulse counter. At this time, conductor XI of the digit counter is again grounded, thereby causing the described operation of relay D2 of the digit counter to occur, followed immediately by the restoration of relay DI.

Relay DI, at its armatures 4 to 7, disconnects grounded conductor 152 from the locking armatures 5 of relays I2 to I5 leaving such armatures supplied with ground potential only by way of conductors 1 to 4 of the first digit group 110, and contacts of the operated relay D2.

In the assumed example, each of the conductors 4 of group 110 is grounded, whereby locking potential is supplied for the first digit locking of each of the relays I2 to I5 of the impulse counter. Accordingly, the operation of the impulse counter proceeds as previously described. That is, relays I2 to I6 operate successively following the operation of relay II, each such relay open-circuiting and restoring the preceding counting relay. Relay I6, being unable to lock, restores at the end of its operating impulse, again bringing the impulse counter to normal condition in readiness for the transmission of the second digit of the number.

Through contacts 1 of relays I2 to I6, conductor Y receives five impulses from conductor X during the transmission of the first recorded digit, 5. As distinct from the operations occurring during the transmission of the preliminary digit blank, relay DI of the digit counter is not then in operated condition. Accordingly, conductor Y is connected to conductor Z, whereby the five impulses received at conductor Y pass over conductor Z to the repeating relay RR. Relay RR accordingly repeats the five impulses of the first digit over the illustrated signal line, to the signal devices such as SD connected thereto.

It is to be noted that no impulse is transmitted to the signal line during the impulse period in which the first counting relay II of the impulse counter is operated, for relay II has no contacts for joining impulse conductors X and Y. This time of one impulse period, required for the operation of relay II, is employed as an interdigit time interval to provide a time separation between successive digits of the same number. This interval is conveniently introduced just preceding each digit transmitted.

IA8. *Transmitting the second recorded digit 5*

With the impulse counter having cleared out as previously described following the transmission of the first recorded digit, conductor XI extending to the digit counter is ungrounded to cause operations to occur therein as previously described, pursuant to its counting operation.

When relay II of the impulse counter next responds to count the inter-impulse interval preceding the transmission of the second recorded digit, it again grounds impulse conductor XI, whereupon counting relay D3 of the digit counter operates as previously described, followed immediately by the restoration of relay D2. The locking armatures 5 of relays I2 to I5 are thereby disconnected from conductors 1 to 4 of the first digit group 110 and transferred to the respective conductors 1 to 4 of the second digit group 111, each of which latter conductors is grounded as previously pointed out. Accordingly, the operation of relay II of the impulse counter pursuant to the transmission of the second recorded digit is followed by the successive operation of relays I2 to I6, relay I6 restoring at the end of its concerned operating impulse, again bringing the impulse counter to normal position.

Five impulses are transmitted over the sending line during the second-digit operation of the impulse counter, through contacts 1 of relays I2 to I6, as described in connection with the transmission of the first digit 5.

IA9. *Transmitting the third recorded digit 5*

When relay II of the impulse counter reoperates at the beginning of the third-digit operation of the impulse counter, the consequent regrounding of conductor XI leading to the digit counter causes relay D4 thereof to operate as previously described, followed immediately by the restoration of relay D3. The locking armatures 5 of relays I2 to I5 are thereby transferred from conductors 1 to 4 of the second digit group 111 to the corresponding conductors of the third digit group 112, each of which is also grounded as previously noted. Accordingly, the impulse counter repeats the described cycle of operations as it transmits the third recorded digit 5.

IA10. *Repeating the number transmission*

When relay I6 of the impulse counter restores at the end of the transmission of the final impulse in the third digit 5 of the called number 555, and again ungrounds conductor XI leading to the digit counter, the final counting relay D4 of the digit counter thereupon restores, again bringing the digit counter into normal condition, coincident with the resumed normal condition of the impulse counter. The foregoing operations are therefore repeated as described for so long a time as start conductor 108 remains grounded.

IA11. *Clearing out*

When the recorded called code number has been transmitted a desired number of times, the operator at the key set KSI actuates the release key R until signal lamp 116 becomes extinguished.

Actuation of key R applies ground potential to conductor 118, thereby holding chain relay CC operated but short-circuiting the upper winding of any operated one of relays C1, C2, and so forth. In the present example, the operated and locked relay is C1. This relay restores responsive to the short-circuiting of its upper winding. At its lower armature, relay C1 removes ground potential from the key-supply conductor 151 of the key set KS1, thereby rendering the keys 113 to 115 again ineffectual, and extinguishing the signal lamp 116.

Upon noting that signal lamp 116 has become extinguished, the operator may release the key R, whereupon chain-control relay CC restores again joining conductor 150 with guard conductor 107, and removing the direct ground connection from conductor 123.

If the sending apparatus shown in part 1 of Fig. 1 is at the moment in the act of transmitting the digit blank, relay D1 of the digit counter is in operated condition and the clearing-out operation immediately follows the described opening of the ground connection to conductor 123. On the other hand, if the impulse-sending apparatus is at some other portion of a number-transmitting cycle, start conductor 108 is connected, at the back contact of armature 3 of the then restored relay D1, to conductor 152, grounded at the front contact of the inner armature of start relay ST. In this event, the sender-controlled ground potential on conductor 108 passes through the right front contact of the lower armature of the operated one of the first digit-recording relays K1 to K5 (relay K5 in the assumed example) to conductor 123, thereby maintaining ground potential on conductor 123 to maintain the operated key relays in locked condition for the time being.

When the impulse sending apparatus next reaches its previously described digit-blank position, and relay D1 of the digit counter reoperates as described, the consequent disconnection of conductor 108 from the grounded conductor 152 at the back contact of armature 3 of relay D1 permits start relay ST, and any locked ones of the key relays K1 to K15, to restore. Upon restoring, relay ST removes ground potential from conductor 152, thereby terminating the cyclic operation of relays G1 to G4 comprising the impulse generator. Any operated ones of the relays of the impulse and digit counters now restore for the lack of operating and locking potential, and the entire system is in normal condition.

With start relay ST and chain-control relay CC restored, energizing potential is reapplied to conductor 150, permitting operation to occur of one or another of the chain relays C1, C2, and so forth, to individualize the recording and sending apparatus with any key set at which the start key is operated as previously described.

As a result of the holding arrangement just described, the operated recording relays are held, and the sending apparatus continues to function, until any partially transmitted number has been completely transmitted, before the equipment is permitted to clear out. Mutilation of the final transmission of a series of transmission of a number is thereby avoided.

IA12. *Explanatory chart; Figure 4*

Reference to the explanatory chart shown in Fig. 4 will render more clear the foregoing described sequence of sending operations. On this chart, vertical line *a* denotes the beginning of the time period devoted to a single transmission of the recorded number 555, and the vertical line *a'* denotes the beginning of the next similar time period, during which the same cycle of operations is repeated; vertical line *b* denotes the beginning of the time interval during which the first recorded digit of the number is transmitted; and vertical lines *c* and *d* denote the beginning of the respective time intervals during which the second and third recorded digits are transmitted. The lapse of time indicated by the spacing between lines *a* and *b* is occupied by the transmission of the preliminary digit blank, the primary purpose of which is to secure internumber spacing, as previously noted.

Horizontal line X represents conductor X of Fig. 1. The heavy portions of this line, numbered 1 to 24, represent the twenty-four impulses which are delivered successively to conductor X by the impulse generator during the single cycle of operations pursuant to transmitting number 555, while the lighter intermediate portions of line X represent the respective inter-impulse intervals.

Lines I1 to I6 refer respectively to relays I1 to I6 of the impulse counter, Fig. 1. Heavy portions of each such line indicate the time intervals during which the concerned relay is operated, the light portions indicating the time intervals during which the concerned relay is in restored condition. From this chart, it is clear that relays I1 to I6 respond respectively at the beginning of impulses 1 to 6 on conductor X; relays I1 to I5 restore respectively at the beginning of impulses 2 to 6 on conductor X (being held locked operated during the concerned inter-impulse interval, as previously described); and that relay I6 restores at the end of the sixth impulse, there being no locking circuit for such relay. The restoration of relay I6 at the end of the sixth impulse brings the impulse counter back to normal condition, wherein no relays therein are operated, as previously explained.

The chart of Fig. 4 further indicates that the operations of relays I1 to I6 illustrated between vertical lines *a* and *b* recur in the same way during the transmission of each of the recorded three digits of the called number 555.

Line Y of Fig. 4 indicates the impulses transmitted by way of conductor X to conductor Y of Fig. 1. The chart shows that conductor Y receives five impulses coincident with the second to sixth impulses placed on conductor X during each of the four time intervals *ab*, *bc*, etc. That is, conductor Y receives all impulses transmitted to conductor X, except the first, transmitted in a digit interval, such first impulse being the one which operates relay I1 and not being transmitted to conductor Y because relay I1 has no contacts thereon for interconnecting conductors X and Y.

Line Z of Fig. 4 represents the impulses transmitted over conductor Z of Fig. 1 to repeating relay RR. Line Z shows that no impulses reach conductor Z of Fig. 1 during transmission of the digit blank, but all impulses transmitted to conductor Y during the respective recorded-digit intervals reach conductor Z. The absence of impulses on conductor Z during transmission of the internumber-spacing digit blank is secured by contacts 1 of relay D1 of the digit counter, which are then open, as previously explained.

Line X1 of Fig. 4 indicates the impulses delivered over conductor X1 to the digit counter. It will be observed that the first impulse on conductor X1 begins at the beginning of the first impulse on conductor X and continues until the end of the sixth impulse on conductor X. This results from the fact that each of the relays I1 to I6 grounds conductor X1, thus providing the desired long impulse thereon, which impulse is terminated when relay I6 restores at the end of any cycle of operations of the impulse counter. As shown by the chart, a further similar impulse is delivered to conductor X1 during each succeeding digit interval.

Lines D1 to D4 on the chart represent respectively the operations of relays D1 to D4 of the digit counter. The chart shows that relay D1 operates at the beginning of the digit blank when the first impulse appears on conductor X1, and remains locked operated until relay D2 operates at the beginning of the transmission of the first recorded digit. The chart shows that, similarly, the relays D2 to D4 operate initially at the beginning of the second, third, and fourth impulses on conductor X1; that each of the relays D2 and D3 remains operated until the next succeeding digit-counter relay operates; and that relay D4 restores at the end of the fourth impulse on conductor X1, returning the digit counter to normal condition in readiness for the starting of a new cycle of operations thereof.

IB. *Transmitting other three-digit numbers*

Any one of the three digits of a three-digit transmitted number can have any value from 1 to 5, the value being determined according to which of the five keys in the concerned one of groups 113 to 115 is operated to record such digit, resulting in the operation of the corresponding one of the associated group of key relays. For example, if the first digit of the number is 4 instead of 5, relay K4 is operated instead of relay K5. Conductor 4 of the first-digit group 110 is then disconnected from conductor 108, conductors 1 to 3 of the same group being left connected. In this event, when the impulse counter goes through the first-digit cycle of operations, with relay D2 of the digit counter in operated condition, the absence of ground potential on conductor 4 of group 110 deprives relay I5 of locking potential. Accordingly, relay I5 restores at the end of the impulse which operated it, and consequently at the end of the transmission of the fourth impulse in the first transmitted digit of the number. The restoration of relay I5 at this time clears out the impulse counter to prepare it for a new cycle of operations, and removes ground potential from conductor X1 to prepare the digit counter for advance to the second-digit position.

Similarly, if any one of the relays K1 to K3 is operated instead of either relay K4 or K5, the corresponding one of conductors 1 to 3 in group 110 is ungrounded, causing the corresponding one of the impulse counter relays I2 to I4 to fail to lock operated during the transmission of the first recorded digit in the number. The current cycle of operations of the impulse counter is accordingly abbreviated to the transmission of one impulse, two impulses or three impulses, to relay RR, dependent upon which of the three digit values under consideration has been recorded for the first digit.

Similarly, if the second digit has a value of from 1 to 4, the corresponding one of the key relays K6 to K9 is operated in place of relay K10. In this event, any operated one of the concerned relays grounds the locking conductor L as described for relay K10, and additionally ungrounds the concerned one of conductors 1 to 4 in the second digit group 111. Accordingly, the concerned one of counting relays I2 to I5 fails to lock operated during the transmission of the second recorded digit (with digit-counter relay D3 in operated condition) terminating the second-digit counting and sending operation correspondingly sooner than in the example first described.

From the foregoing it will be appreciated that the remarks concerning other values of the second digit apply to other values for the third digit, in that any one of the relays K11 to K14 can be operated in place of relay K15, disconnecting one or another of the conductors 1 to 4 of the third digit group 112 to give the third recorded digit a correspondingly reduced value.

Since the impulse counter, upon being cleared out, immediately starts a new cycle of operations, the interdigit spacing is independent of the number of impulses in the digit last counted, for the spacing interval is introduced by the time interval consumed by the operation of relay I1 ahead of relay I2, impulse transmission (over conductors Y and Z) not starting in any event until relay I2 operates, as previously described.

IC. *Transmitting two-digit numbers*

If the code number being called contains only two digits, the key set operator operates a key of group 113 according to the value of the first digit and a key of group 114 according to the value of the second digit, but fails to operate a key of group 115. In this event, operations as previously described occur to cause transmission of the preliminary digit blank, followed by transmission of the two recorded digits of the number. The transmission of the second recorded digit of the number occurs, as described, with relay D3 of the digit counter in operated condition. In the foregoing description it was pointed out that relay D3 locks operated through relay D0 and over conductor L in group 112, when the number being called contains three digits. With a two-digit number recorded, conductor L of group 112 is not grounded, for none of the relays K11 to K15 is then in operated condition. In this event, relay D3 closes no locking circuit for itself (at its armature 3 and associated contact). Accordingly, relay D3 restores responsive to the ungrounding of conductor X1, next ensuing, at the end of the second transmitted digit of the number. The restoration of D3 in this event completely clears out the digit counter for a new cycle of operations, at the beginning of which relay D1 again operates to control the transmission of the internumber-spacing digit blank, pursuant to the next cycle of sending operations.

ID. *Transmitting single-digit numbers*

When a single digit number is to be transmitted, a key in group 113 is actuated to cause one or another of key relays K1 to K5 to operate, but none of the keys in groups 114 and 115 is operated, whereby all relays K6 to K15 remain in normal position. In this event, neither of the conductors L in groups 111 and 112 is grounded. Accordingly, when relay D2 of the digit counter operates to connect conductors 1 to 4 of the next digit group 110 to the circuit conductors of the impulse counter, relay D2 fails to lock operated because of the absence of locking ground on conductor L of digit group 111. As a result, when conductor X1 is next ungrounded, at the termination of the first-digit counting operation of the impulse counter, relay D2 immediately restores and returns the digit counter to normal condition, whereby a new cycle of operations is commenced to immediately repeat the transmission of the single recorded digit, as soon as the internumber spacing operation of the impulse counter has again occurred.

IE. *Regulating the internumber space interval*

The length of the internumber space interval (of the previously described digit blank) can be reduced as desired by omitting connections between armatures 3 to 7 of relay DI of the digit counter. For example, if the connection between armatures 4 and 5 of relay DI is severed, the previously described locking circuit for relay I5 of the impulse counter, during transmission of the digit blank, is opened with the result that relay I5 does not lock during the transmission of the digit blank. The impulse counter then, clears out at the end of the impulse effective to operate relay I5. In this event, the length of the spacing digit blank is reduced by one impulse cycle on conductor X, such digit then occupying only five impulse cycles instead of the six indicated in Fig. 4.

If the connection between armatures 5 and 6 of relay DI is severed, relay I4 of the impulse counter fails to lock during transmission of the digit blank, in which case the length of this spacing digit is further reduced to four impulse cycles.

If the connection between armatures 6 and 7 of relay DI is severed, relay I3 fails to lock, giving the digit blank only a three-impulse length.

Finally, if the connection between armatures 3 and 7 of relay DI is severed, only relay II of the impulse counter can lock operated during transmission of the digit blank, in which event such digit consumes only the time of the two impulse cycles on conductor X required for the successive operation of relays II and I2. The operation is then terminated when relay II, failing to lock operated, restores and brings the impulse counter to normal condition in readiness for starting transmission of the first recorded digit.

IF. *Clearing out from another key set*

The clearing out operations previously described as occurring responsive to operation of the release key R at key set KSI may be performed at any other key set, such as KS2, independent of with which key set the system is then individualized, for conductor II8, which is grounded to cause the described clearing out operation, is common to all the key sets, as indicated, and operation of release key R at any key set grounds this same conductor, to thereby short-circuit and restore any operated one of the chain relays CI, C2, and so forth. This arrangement enables a key set operator who may have a more urgent code call to impress on the system to clear out the system to that end before the system is cleared out by the operator who originated the call being currently transmitted. Additionally, if an operator should be called away from his key-set station without clearing out, an operator at any other key set can perform the clearing-out operation.

IG. *Transmitting entrance signals*

Referring now to the entrance group comprising relays I to 5 (part 3 of Fig. 1) and associated equipment, the operation of the system to transmit entrance signals will be described.

In many establishments, a watchman or similar person is on the premises continuously during non-business hours. The duties of such watchman ordinarily include admittance to the premises of any authorized persons. The watchman is expected to make regular tours of the premises and is accordingly not located continuously at any one station. He is accordingly conveniently called over the general calling system, through operation of signalling devices SD.

Many establishments have a number of entrances. The illustrated arrangement is such that the watchman, on being called from any entrance, is informed of the identity of such entrance.

The entrance group of call relays comprises relays I to 5, providing for any number of entrances up to five. At each entrance, a push button such as I2I may be provided to cause the operation of the associated entrance relay. Associated with each entrance is a normally closed stop button I22, used to unlock and restore the associated entrance relay, such as 5.

The entrance group of equipment is arranged to be placed in operative condition by the closing of a conveniently located entrance key EK, which may be closed only during nonbusiness hours.

With the key EK operated, if the start push button I2I at the entrance with which relay 5 is associated be operated, relay 5 operates and locks to ground through its own contacts, contacts of stop button I22, and contacts of the entrance key EK. Relay 5 also closes an operating circuit for relay K5 of the first-digit group of recording relays, provided no other one of the relays KI to K5 is in operated condition. If no other one of the relays KI to K5 is operated, then relay K5 responds and extends its operating ground potential to start conductor I08 to start the sending equipment into operation. Since none of the remaining key relays K6 to KI5 is operated, the equipment functions as previously described to transmit a single-digit number, and the digit value of this number will be 5 when relay K5 is the one operated, by entrance relay 5.

When the watchman responds to the entrance signal, he may terminate the signalling operation and clear out the equipment by momentarily operating push button I22, which may be conveniently located near the concerned entrance. Relay 5 is unlocked and restored by operation of button I22, opening the initial circuit of the associated relay K5, and the latter relay promptly restores, provided start conductor I08 is not at the moment held grounded by the sending equipment. In the latter case, the restoration of relay K5 is delayed until the sending apparatus reaches the internumber portion of its cycle, as previously described.

It will be apparent that the other relays I to 4 of the entrance group similarly control key relays KI to K4 respectively to cause transmission of the respective call numbers 1 to 4.

The first and second upper armatures of key relays KI to K5, together with their associated contacts and the illustrated interchaining connections, are for the purpose of avoiding interference in the event that operation of one or more additional entrance relays occurs before the watchman has responded and cleared out a previously operated entrance relay. Suppose, for example, that entrance relay I becomes operated and locks while entrance relay 5 is in operated condition and is maintaining key relay K5 operated. In this event, the grounding by relay I of the lead extending to relay KI is of no immediate effect, for operating potential is removed from the common chain-end conductor I55 at the contacts of relay K5. Operating potential is removed from conductor I55 at the normally closed contacts controlled by the second upper armature of any operated one of the relays KI to K5.

When relay K5 is subsequently restored, responsive to the restoration of relay 5 as described, operating potential is replaced on conductor 155, whereupon the prepared circuit for relay K1 becomes effective. Relay K1 thereupon operates and locks operated at its first upper armature and front contact, again removing operating potential from conductor 155 to prevent operation of any remaining ones of the relays K2 to K5 if a further entrance relay should become operated and locked before the watchman has responded.

IH. Alarm operation

As previously noted, the equipment illustrated in the upper left-hand corner of part 1 of Fig. 1 is provided for the sounding of a distinctive alarm over the common code-call system, when desired. For this purpose, an alarm box such as 100 is provided, and any desired number of similar alarm boxes may be connected in parallel therewith. A common use for such an alarm box is to indicate that a fire has broken out on the premises, or that some other emergency condition has arisen.

When the contacts of alarm box 100 close, relay 105 responds, thereby closing a circuit through contacts of key 103 for relay 106. Relay 106 applies ground to start conductor 108 to start the sending equipment into operation, and it directly connects conductor Z to conductor X, causing each impulse from the impulse generator to be transmitted to conductor Z. The result is the delivery of a continuous succession of impulses to signal devices SD.

When the alarm condition is ended and the contacts of alarm box 100 have been opened, relays 105 and 106 restore successively, and the sending apparatus ceases operation responsive to the resultant removal of ground potential from start conductor 108.

Key 103 is provided to disable relay 105 in the event that the contacts of the concerned alarm box are not promptly reopened on the termination of the alarm condition. Upon being operated, key 103 disconnects the front contact of relay 105 from relay 106, permitting relay 106 to restore and terminate the alarm signal. Key 103 further connects the back and front contacts of relay 105 to signal lamps 101 and 102. Lamp 102 thereupon becomes lighted as a signal that relay 105 is still operated.

When the alarm circuit is subsequently restored to normal condition, permitting relay 105 to restore, lamp 102 becomes extinguished and lamp 101 becomes lighted as a signal that the alarm circuit is now clear. The operator may then restore key 103, extinguishing lamp 101 and again preparing a circuit for relay 106.

Key 104 is provided to enable the alarm condition to be initiated by a key set operator, as from direct observation or from a telephone report. When operated, key 104 operates relay 106 with results as previously noted. Relay 106 restores when key 104 is next opened.

It will be apparent that the alarm condition takes precedence over any other call that may be sounding, and that the sounding of the previous call is resumed on the termination of the alarm condition.

II. FIGURE 2

IIA. Calling No. 555

A detailed description of the operation of the modified system shown in Fig. 2 will now be given, for which purpose it will be assumed that the operator at key set KS1', part 2 of Fig. 2, desires to transmit call number 555.

IIA1. Recording call No. 555

The operator at key set KS1' may first record call No. 555 by operating key 5 in each of the digit columns 213, 214, and 215. The digit keys of this key set being locking keys, the record of the called number is retained thereon. The key set operator will of course restore any operated ones of the remaining digit keys of the key set, to the end that only the desired key in each of the columns 213 to 215 is in operated condition.

IIA2. Individualizing the system with key set KS1'

The operator at key set KS1' may now operate non-locking start key S' momentarily to cause the system to become individualized with such key set. Key S' applies ground potential (obtained over ground conductor G in cable CA1) to lead O in cable CA1. The grounding of conductor O, if the system is in normal condition, closes a circuit through the operate winding of relay C1', to battery by way of contacts of chain-control relay CC', guard conductor 207, and contacts 3 of start relay ST'. Upon operating, relay C1' closes a self-locking circuit for its right-hand winding, through the winding of relay CC'. Relay CC' thereupon operates and disconnects guard conductor 207 from conductor 250, thereby disabling any remaining relays C2', and so forth, from operating. Relays C1' and CC' remain operated in series thereafter. Lamp 216 lights in parallel with the right-hand winding of relay C1'. Relay C1' connects conductor ST in cable CA1 to start conductor 208; connects digit leads 1 to 5 in cable CA1 respectively to mark leads M1 to M5; and connects leads L2' and L3' respectively to locking leads L2 and L3.

IIA3. Starting the sending operation

With key 5 of digit column 213, and individualizing relay C1', operated, a circuit for relay ST' is closed: from ground through the lower contact pair of such key 5, conductor ST in cable CA1, contacts of the operated relay C1', start conductor 208, and thence to operating potential by way of the winding of start relay ST'. At its contacts 3, relay ST' removes operating potential from guard conductor 207; at its contacts 1, it grounds conductor 209; and, at its contacts 2, it closes a self-locking circuit to the grounded conductor 209 by way of back contact 3 of relay D1'. As described in connection with Fig. 1, cyclic operation of the impulse generator comprising relays G1' to G4' occurs responsive to the grounding of conductor 209. Impulses are transmitted alternately over conductors 261 and X'.

A further result of the application of ground potential to conductor 209 is the grounding of conductor X1' through contacts of relay I6' of the impulse counter. The grounding of conductor X1' (corresponding in function to conductor X1 of Fig. 1) results in the operation of relay D1', associated with the transmission of the preliminary digit blank. At its armature 3 and front contact, relay D1' closes a self-locking circuit through control relay DO', to secure the operation of the latter relay when the instant impulse on conductor X1' is terminated. At the back contact of its armature 3, relay D1' opens the self-locking circuit of relay ST' to permit clearing out to occur during the transmission of any preliminary digit blank, about as described in connection with Fig. 1.

IIA4. *Transmitting the initial digit blank*

Preparatory to the transmission of the initial digit, relay DI' of the digit counter disconnects conductor Y' from conductor Z' at its contacts 1, while at its contacts 4 it connects the current-supply conductor 200 (receiving its current supply through protective resistor 260 and the contact chain controlled by relays II' to I6') to conductor DCB (digit control—blank), thereby supplying operating potential to the upper winding terminal of the first counting relay II' of the impulse counter.

With conductor DCB energized as described, to apply energizing potential to the upper winding terminal of relay II', the first grounding of impulse conductor 261 by the associated impulse generator results in the operation of relay II' through contacts 2 of relay I0'. Relay II' closes a self-locking circuit at its contacts 4 to grounded conductor 209 to secure the operation of relay I0' at the end of the impulse on conductor 261; at its contacts 3, it locks operating potential (through chain contacts of the succeeding counting relays) on its upper terminal; at its contacts 2, it prepares to place operating potential on the upper winding terminal of the next succeeding counting relay I2'; and, at its contacts 1, it joins impulse conductor X' to conductor Y', but the latter operation is of no effect at this time (during transmission of the digit blank) for conductors Y' and Z' are now disconnected at contacts 1 of the operated relay DI'.

When the first impulse on conductor 261 is terminated, relay I0' operates in the locking circuit of relay II', and supplies operating potential to the upper terminal of relay I2', through contacts 2 of relay II'.

Relay I2' operates through contacts of relay IE', responsive to the next impulse on conductor 261, whereupon it locks itself to conductor 209 through relay IE'; locks operating potential on its upper winding terminal through the contact chain controlled by the succeeding counting relays, at the same time open-circuiting and restoring relays II' and I0'.

When the second impulse on conductor 261 is terminated, relay IE' operates to place operating potential on the upper terminal of the third counting relay I3', by way of its own contacts 1, and contacts 2 of relay I2'.

Relays I3' and I4' respond respectively to the third and fourth impulses on conductor 261, and relays I5' and I6' respond respectively to the fifth and sixth impulses. Each such relay, on responding, restores the preceding counting relay, along with the associated one of the control relays I0' and IE'. Each of the relays II' to I5' locks operated as described for relays II' and I2', but relay I6' does not lock operated independent of conductor 261.

When relay I6' operates, besides restoring relay I5' and the associated relay I0' at the contacts controlled by its armature 1, it disconnects impulse conductor XI' at its contacts 2, thereby terminating the impulse to the latter conductor. When this occurs, relay D0' operates in the locking circuit of relay DI' to apply operating potential to the upper terminal of relay D2', through its own contacts 1 and contacts 2 of the operated relay DI'.

When the sixth impulse on conductor 261 is terminated, relay I6', not having locked operated independent of such impulse conductor, immediately restores, returning the impulse counter to its illustrated normal condition.

The preliminary digit blank, having a duration equal to six cycles of the impulse generator, has now been completely transmitted.

In the illustrated example, conductor DCB extends from armature 4 of relay DI' to the upper winding terminal of relay II'. If a lesser duration is desired for the preliminary digit blank, conductor DCB may be disconnected from the upper winding terminal of relay II' and connected to the corresponding terminal of one or another of the relays I2' to I5'. Connection of conductor DCB to the upper winding terminal of relay I5', for example, reduces the duration of the digit blank to that of two cycles of operation of the impulse generator, for then, only counting relays I5' and I6' are effective during transmission of the internumber-spacing digit blank.

IIA5. *Transmitting the first recorded digit 5*

When relay I6' restores at the end of the transmission of the preliminary digit blank, it again grounds conductor XI', thereby operating counting relay D2' through contacts 2 of relay DE', the operating circuit including contacts of 2 and 1 of relays DI' and D0'.

Relay D2' locks operating potential on its winding terminal at its armature 2 and front contact, at the same time open-circuiting and restoring relays DI' and D0'. Conductor DCB is thereupon disconnected by relay DI'.

At its contacts 4, relay D2' connects operating potential, obtained over conductor 200 and resistor 260, to conductor DCI (digit control—first). With the upper contacts of key 5 of the first column 213 closed, the operating potential is further extended to conductor 5 in cable CAI, and thence, through contacts of the operated chain relay CI and marking conductor M5, to the upper winding terminal of the first counting relay II' of the impulse counter.

Responsive to the next ensuing impulse on conductor 261, relay II', whose upper winding terminal is supplied with operating potential over conductor M5 as above noted, operates through contacts of relay I0' with results substantially as above described in connection with the transmission of the preliminary digit blank. At this time, with relay DI' in restored condition and conductors Y' and Z' consequently reconnected, the closing of contacts 1 of relay II' results in the joining of conductors X' and Z'. Accordingly, when relay G2' of the impulse counter restores to terminate the instant impulse over conductor 261, it transmits an impulse over conductors X', Y', and Z' to repeating relay RR shown in Fig. 1.

Relays I2' to I6' respond as previously described to the impulses respectively succeeding the one serving to operate relay II'. Conductors X' and Y' are maintained connected together by contacts 1 of relays I2' to I5', whereby five impulses have been transmitted over conductors X', Y', and Z' to relay RR by the time relay I6' operates to restore relay I5', and thereby again separate conductors X' and Y'.

The impulse counter is again brought to normal condition by the restoration of relay I6' at the termination of the sixth impulse received over conductor 261 by the impulse counter pursuant to the transmission of the first recorded digit 5 of the called number. With conductors X' and Y' again separated, no impulse is transmitted to the repeating relay during the interval between the lastnamed impulse over conductor 261 and the next succeeding impulse thereover, whereby an interdigit space is introduced, one impulse cycle longer than the inter-impulse space, and of a length similar to that of the interdigit space introduced as described in connection with the operation of the apparatus disclosed in Fig. 1.

IIA6. *Transmitting the second recorded digit 5*

When relay I6' ungrounds conductor XI' at the end of the transmission of the first recorded digit, digit-counter relay D2' remains operated, and control relay DE' operates, over the following self-locking circuit, effective only when the number called contains a second digit: from ground over conductor G in cable CAI, the lower contacts of any operated key in column 214 (key 5 in such column in the assumed example), conductor L2', contacts of the operated chain relay CI', second-digit locking conductor L2, contacts 3 of the operated relay D2', winding of relay DE', winding of relay D2', and thence to operating potential through the operated armature 2 of relay D2' and chain contacts of the associated succeeding counting relays.

Upon the restoration of the non-locking relay I6' of the impulse counter at the end of its operating impulse over conductor 261, the consequent regrounding of conductor XI' closes an operating circuit, through contacts 2 of the restored relay DO', for relay D3', by way of contacts 1 of relays D2' and DE'. Relay D3', at its contacts 2, locks itself to operating potential through contacts of relay D4', at the same time open-circuiting and restoring relays D2' and DE'.

Relay D2', at its contacts 4, disconnects energizing potential from conductor DC1, thereby removing marking potential from all of the keys in column 213 of KSI', thereby removing the impulse counter from under the control of the keys in this column. At its contacts 4, relay D3' applies energizing potential to conductor DC2, extending to the upper contacts of the keys in the second-digit column 214 of KSI', whereby the impulse counter is placed under the control of the keys in such column. With key 5 in this column operated, the operating potential is further extended to conductor 5 in cable CAI, and thence through contacts of relay CI', and mark conductor M5, to the upper winding terminal of relay II' of the impulse counter.

The cycle of operations of the impulse counter described in connection with the transmission of the first recorded digit 5 is now repeated, during which the five impulses corresponding to the second recorded digit 5 are transmitted over conductors X', Y', and Z' to the repeating relay RR.

IIA7. *Transmitting the third recorded digit 5*

When relay I6' ungrounds conductor XI' at the end of the transmission of the second recorded digit, digit-counter relay D3' remains operated, and control relay DO' operates, in the following locking circuit, effective only if the number recorded is a three-digit number: from ground on conductor G in cable CAI, through the lower contacts of any operated key in column 215 of KSI' (key 5 of such column in the assumed example), conductor L3', contacts of relay CI', third-digit locking conductor L3, contacts 3 of counting relay D3', winding of relay DO', winding of relay D3', contacts 2 of the operated relay D3', and, through normally closed contacts controlled by armature 1 of relay D4', to operating potential.

Upon the next ensuing restoration of non-locking relay I6', the consequent regrounding of conductor XI' closes a circuit through contacts of the restored relay DE' for counting relay D4', supplied with operating potential through contacts 1 of relays D3' and DO'. At its contacts 1, relay D4' locks operating potential on its upper winding terminal, at the same time open-circuiting and restoring relays DO' and D3'.

By opening its contacts 4, relay D3' removes operating potential from conductor DC2, thereby removing the impulse counter from under the control of the second-digit column 214 of key set KSI'.

At its contacts 2, relay D4' applies operating potential to conductor DC3 (digit control—third), extending to the upper contacts of the third-digit keys, column 215 of KSI', whereby the impulse counter is placed under the control of the keys in such column. With key 5 in this column operated, the operating potential is further extended to conductor 5 in cable CAI, and thence, through contacts of relay CI' and over mark conductor M5, to the upper winding terminal of relay II' of the impulse counter.

The cycle of operations of the impulse counter described in connection with the transmission of the first recorded digit 5 is again repeated, during which five impulses corresponding to the third recorded digit 5 are transmitted over conductors X', Y', and Z' to the repeating relay RR.

IIA8. *Repeating the number transmission*

When relay I6' of the impulse counter operates at the end of the transmission of the third recorded digit 5 to unground conductor XI', relay D4' immediately restores, not having locked operated independent of conductor XI'. The restoration of relay D4' clears out the digit counter, returning it to its illustrated normal condition. The impulse counter is cleared out and returned to normal condition upon the termination of the instant impulse over conductor 261, following which operations as described recur so long as start conductor 208 remains grounded, to hold start relay ST' grounded.

IIA9. *Clearing out*

When the non-locking release key R' at key set KSI' (or the corresponding key at KS2') is actuated to clear out, no effect is produced until the sending apparatus again reaches the digit-blank position, whereupon relay DI' grounds release lead RL. Ground is then transmitted through key R', and over conductor H in cable CAI, to the right-hand terminal of chain-control relay CC', thereby short-circuiting lamp 216 and the right-hand winding of the operated chain relay CI'. Consequently, lamp 216 becomes extinguished, and relay CI' restores, opening the connection between its right-hand winding and that of relay CC'. Relay CI' also disconnects conductors ST, 5 to 1, L2', and L3' in cable CAI from the corresponding common conductors, terminating the individualization of the system with key set KSI'.

The described restoration of relay CI', by disconnecting conductors ST and 208, removes the ground connection initially applied to start conductor 208. Since this operation occurs while relay DI' is operated, relay ST' is not then locked locally, for start conductor 208 is disconnected from ground-supply conductor 209. Start relay ST' accordingly restores and ungrounds conductor 209, thereby terminating operation of the impulse generator, the impulse counter, and the digit counter.

Incident to the clearing-out operation, relay D1' restores, ungrounding lead RL, whereupon relay CC' restores, again energizing conductor 250 to permit individualization of the system with a key set.

The operator may release key R' upon noting that the lamp 216 has become extinguished.

IIB. *Calling other 3-digit numbers*

Any desired 3-digit number other than the previously assumed number 555 may be set up on the key set KS1'. For example, if the first digit of the called number is 4, key 4 of column 213 is operated instead of key 5. In this event, when digit-control lead DC1 is energized, energizing potential is transmitted (over conductor 4 of cable CA1 and through contacts of relay C1') to mark conductor M4, instead of to mark conductor M5. Mark conductor M4 extends to the upper winding terminal of the second counting relay I2' of the impulse counter, whereby relay I2' is initially operated instead of relay I1', at the beginning of the transmission of the first recorded digit. As a result, one less impulse is required to operate the impulse counter through the shortened cycle of operations, resulting in only four impulses being transmitted to the repeating relay. Similarly, mark conductor M3 is the one energized if key 3 is the one operated in column 213, whereby the cycle of operations of the impulse counter is further shortened in that relay I3' is the one initially operated.

If the second key in column 213 is the one operated, mark conductor M2 is the one energized, resulting in the initial operation of counting relay I4', in which case only two impulses are transmitted to the repeating relay.

Finally, if key 1 of column 213 is operated, mark conductor M1 is the one energized, resulting in the initial energization of relay I5' of the impulse counter, in which event only a single impulse is transmitted to the repeating relay as the first recorded digit.

Similarly, the second and third recorded digits may have any value of from 1 to 4 instead of the described value of 5, provided the corresponding keys are operated in columns 214 and 215 of KS1'.

IIC. *Calling 2-digit numbers*

If the number being called contains only two digits, the operator at key set KS1' actuates the desired keys in columns 213 and 214, and restores any key which may be actuated in column 215. Locking conductor L3' in cable CA1 is accordingly not grounded, wherefore locking conductor L3 is not grounded. In this event, counting relay D3' of the digit counter cannot lock operated independent of conductor X1'. Relay D3' therefore restores at the end of the transmission of the second recorded digit, returning the digit counter to normal condition. The new cycle of operations is therefore started at the end of the transmission of the second recorded digit.

IID. *Calling single-digit numbers*

When a single-digit number is to be called, the operator at key set KS1' operates the desired key in column 213, and restores any operated one of the remaining keys of the key set. Accordingly, neither conductor L2 nor L3 is grounded. In this event, counting relay D2' of the digit counter cannot lock operated independent of conductor X1'.

Relay D2' accordingly restores at the end of the transmission of the first recorded digit, starting a new cycle of operations at that point.

III. FIGURE 3

IIIA. *Calling a 3-digit number*

The operation of the apparatus shown in Fig. 3 (a modification of the register portion of Fig. 2) will now be described. For this purpose, it will be assumed that the operator at control station CS1 desires to transmit a 3-digit called number. It will be recalled that Fig. 3 is a modification of that portion of Fig. 2 lying below broken line 3—3.

IIIA1. *Individualizing the system with control Station CS1*

The system must first be individualized with the calling control station, station CS1 in the assumed example. For this purpose, the operator actuates start key S², thereby extending ground potential to the left terminal of the lower winding of chain relay C1². The operation closes a circuit for the lower winding of relay C1² by way of conductor 350, contacts of relay CC², and thence by way of guard conductor 207 to the source of operating potential as shown in Fig. 2.

Relay C1² now operates and prepares a locking circuit for itself over conductor 301, in series with chain-control relay CC². This locking circuit is maintained open for the time being until impulse relay IMP operates.

At its lower contacts, relay C1² closes a circuit for impulse relay IMP: From ground through the normally closed impulse contacts of the calling device CD, signal lamp 316, lower contacts of relay C1², the winding of relay IMP, to the operating potential. Relay IMP thereupon operates to break connection with impulse conductor 302, preparatory to impulse transmission. Relay IMP also connects the upper winding terminal of chain-control relay CC² to locking conductor 307, thereby completing the prepared locking circuit for the upper winding of relay C1². Relay CC² thereupon operates in the noted locking circuit. At its upper contacts, it connects the grounded conductor 303 to the upper armature of relay IMP; at its inner upper contacts, it shunts the corresponding contacts of relay IMP to maintain the locking circuit intact during the impulsing operation; at its inner lower contacts, it disconnects guard conductor 207 from conductor 350, rendering relay C1² dependent on its locking circuit; and at its lower contacts, it grounds conductor 309, thereby energizing the lower winding (the holding winding) of control magnets 304 to 308 of registers R1 and R3 respectively. No immediate cooperational effect is produced by the energization of these holding windings.

With relays IMP and CC² operated, the receiving circuits are now conditioned for the setting of the first register R1. This fact is indicated to the operator by the glowing of signal lamp 316 in series with relay IMP.

IIIA2. *Transmitting and recording the first digit*

The operator at control station CS1 may now operate the calling device CD in accordance with the first digit in the desired number, whereupon the impulse contacts of the calling device separate momentarily a corresponding number of times, each time opening the previously traced circuit for relay IMP.

Relay IMP momentarily restores each time its circuit is opened at the calling device CD. Each time it does so, it connects the grounded conductor 303 with conductor 302, thereby closing a circuit, through contacts of transfer relay TR1, for the upper (operating) winding of magnet 304 of the first register R1. The operate winding of magnet 304 is accordingly energized a number of times corresponding to the value of the first transmitted digit. On the first energization of the operate winding of magnet 304, its associated off-normal contacts ON are closed, along ith register contacts 1. The off-normal contacts remain closed thereafter until the register is cleared out.

In the event that the transmitted impulse series contains further impulses, the receipt of the second impulse by the operate winding of magnet 304 results in the closure of the second set of register contacts 2, preceded slightly by the opening of contacts 1. That is, upon the closure of any of the register contacts 2 to 0 of the register R1, the preceding register contacts open just before the new closure is effected. By the operation now being described, one or another of the marking leads M1 to M5 of the register R1 is connected to the first-digit control lead DC1, preparatory to the transmission of the first recorded digit.

With off-normal contacts ON of the register R1 closed, on each reoperation of relay IMP, ground is extended to the lower winding terminal of transfer relay TR1: from the grounded upper armature of relay IMP, conductor 301, off-normal contacts ON of register R1, and the normally closed contacts controlled by the lower armature of relay TR1. Relay TR1 is so wound and adjusted that it does not operate during the vibratory action of relay IMP while the remaining impulses of the series are being transmitted. But, relay TR1 operates when relay IMP comes to rest, in operated condition, at the end of the impulse series. At its lower armature, relay TR1 locks itself directly to the grounded conductor 300, at the same time opening its initial operating circuit. At its inner upper armature, relay TR1 disconnects conductor 302 from the operate winding of magnet 304 of the register R1 and transfers it to the corresponding winding of magnet 303 of the register R2, preparing the register R2 to receive the second transmitted digit in the number being called.

When the calling device CD is operated in accordance with the second digit in the desired number, the resulting impulses transmitted over conductor 302 by relay IMP are delivered, through contacts of the operated relay TR1 and contacts of the unoperated relay TR2, to the operate winding of magnet 303. The register R2 operates as described for the register R1, connecting one or another of the mark leads M1 to M5 to the second-digit control conductor DC2, according to the value of the called second digit.

When relay IMP comes to rest in an energized condition at the end of the second digit, transfer relay TR2 (having characteristics similar to those of TR1) operates over conductor 301 and through off-normal contacts of the second register. Upon operating, relay TR2 locks itself directly to conductor 300, and transfers impulse conductor 302 from the operate winding of the second register to the operate winding of magnet 306 of the third register R3. Accordingly, register R3 responds as described for the registers R1 and R2 and records the value of the third digit by connecting the third-digit conductor DC3 to one or another of the mark leads M1 to M5.

IIIA3. *Transmitting the recorded number*

Transmission of the recorded number (by the apparatus shown above the broken line 3—3 of Fig. 2) is started responsive to the grounding of start conductor 208, effected by the upper contacts of transfer relay TR1 at the end of the transmission of the first digit from the control station.

When, following transmission of the preliminary digit blank, digit-control lead DC1 is energized, marking potential is thereby extended through the closed pair of register contacts of the register R1 to the concerned one of the mark leads M1 to M5, thereby causing the impulse counter of Fig. 2 to transmit the first digit of the recorded value. Similarly, when the energizing potential is transferred from conductor DC1 to DC2, one or another of the mark leads M1 to M5 is energized depending upon the setting of the register R2, causing the second transmitted digit to have a corresponding value. Finally, when the energizing potential is transferred to digit control conductor DC3, one or another of the mark leads M1 to M5 is supplied with energizing potential according to the setting of the register R3, causing the third transmitted digit to have a value corresponding to such setting.

The fact that a second digit has been recorded is indicated to the digit counter of Fig. 3 by the application of ground potential to locking conductor L3 at the upper contacts of second transfer relay TR2. The fact that a third digit has been recorded is indicated to the digit counter of Fig. 3 by the grounding of locking conductor L3 at the off-normal contacts of the register R3.

IIIA4. *Clearing out*

When the recorded number has been transmitted a desired number of times, the operator at control station CS1 may initiate the clearing-out operation by momentarily actuating the non-locking release key R². Operation of this key grounds conductor 307, thereby short-circuiting the upper winding of chain relay C1². Relay C1² thereupon restores. At its upper contacts, relay C1² ungrounds conductor 303, thereby preventing the transmission of a further impulse over conductor 302 upon the restoration of relay IMP, which occurs responsive to the opening of the lower contacts of relay C1².

Lamp 316 becomes extinguished responsive to the opening of the lower contacts of relay C1², notifying the operator that the release key R² may be restored. Upon the restoration of key R², chain-control relay CC² restores. At the lower contacts of relay CC², the ground connection initially made to conductor 300 is opened, leaving this conductor grounded, if at all, by way of start conductor 208. If start conductor 208 is grounded, as it is when the impulse-sending apparatus is in any position other than its digit-blank position, conductor 300 is thereby maintained grounded to hold relays TR1 and TR2 operated, along with the registers R1 to R3.

When the sending apparatus next reaches its digit-blank position, and start conductor 208 becomes ungrounded, conductor 300 is consequently ungrounded, permitting relays TR1 and TR2 to restore. At the same time, the hold windings of magnets 304 to 306 are open-circuited, permitting the registers R1 to R3 to clear out. The restoration of start relay ST' of Fig. 2, occurring responsive to the ungrounding of conductor 208, reapplies potential to guard conductor 207.

and consequently to conductor 350, again permitting the system to become individualized with one or another of the control stations.

IIIB. *Transmitting 2-digit numbers*

When the called number contains only two digits, no impulses are transmitted to the register R3 and consequently the off-normal contacts ON thereof remain open. In this event, locking conductor L3 is not grounded, wherefore the digit counter of Fig. 2 clears out at the end of the transmission of the second-recorded digit.

IIIC. *Transmitting single-digit numbers*

When the number being transmitted contains only a single digit, only the register R1 is operated. Consequently, transfer relay TR2 is not in operated condition, wherefore no ground potential is applied to locking conductor L2, permitting the digit counter of Fig. 2 to clear out at the end of the transmission of the first-recorded digit.

Reference is made to my divisional application, Serial Number 642,413, filed January 19, 1946, for Code-call systems, claiming subject matter disclosed herein.

I claim:

1. In combination, a signal line, a sending device operable to transmit a variable series of impulses over said line, said sending device having a normal position and a plurality of off-normal positions, means for causing said sending device to assume successive ones of said off-normal positions incidental respectively to the transmission of successive impulses of the series, the sending device being so constructed and arranged that a flow of holding current is required to maintain it in any said off-normal position between impulses, a source of holding current, branch conductors interposed between said source and said sending device, normally closed switches included in said branch conductors respectively, means incidental to the operation of the sending device for rendering such device dependent successively on the flow of holding current over said branch conductors, and recording means for opening a desired one of said normally closed switches according to the number of impulses desired to be transmitted, said sending device, on reaching the branch conductor containing the opened switch, returning to normal condition and terminating the series of impulses responsive to the consequent cessation of the flow of holding current.

2. In combination, a signal line and a sending device operable to transmit a variable series of impulses thereover, said sending device including a counting chain of relays, means for causing said relays to operate successively incidental respectively to the transmission of successive impulses of the series, the counting chain being so arranged that a flow of holding current is required to maintain any operated relay thereof in operated condition between impulses, a source of holding current, branch holding conductors interposed between said source and said counting chain, means incidental to the operation of the counting chain for rendering the operated relays thereof directly dependent for holding current on said conductors successively, and recording means for opening a desired one of said conductors and closing the preceding ones according to the number of impulses desired to be transmitted, said counting chain, on reaching the opened conductor, returning to normal condition and terminating the series of impulses responsive to the restoration of any operated relay thereof upon the consequent failure of the flow of holding current.

3. In combination, a signal line, a sending device operable to transmit a message comprising a variable number of characters over said line, a character-control device having a normal position and a plurality of off-normal positions, means for causing said character-control device to assume successive ones of said off-normal positions incidental respectively to the transmission of successive characters of the message, the character-control device being so constructed and arranged that a flow of holding current is required to maintain it in any said off-normal position between successive character transmissions, a source of holding current, branch conductors interposed between said source and said sending device, means incidental to the operation of the character-control device for rendering such device dependent successively on the flow of holding current over said branch conductors, and recording means for opening a desired one of said branch conductors and closing the preceding ones according to the number of characters in the message, said character-control device, on reaching the opened branch conductor, returning to normal condition and terminating the message responsive to the consequent cessation of the flow of holding current.

4. In combination, a signal line, a sending device operable to transmit a message comprising a variable number of characters over said line, a character-control device including a counting chain of relays, means for causing said relays to operate successively incidental respectively to the transmission of successive characters of the message, the counting chain being so arranged that a flow of holding current is required to maintain any operated relay thereof in operated condition between impulses, a sources of holding current, branch holding conductors interposed between said source and said counting chain, means incidental to the operation of the counting chain for redering the operated relays thereof dependent for holding current on said conductors successively, and recording means for opening a desired one of said conductors and closing the preceding ones according to the number of impulses desired to be transmitted, said counting chain, on reaching the opened conductor, returning to normal condition and terminating the message responsive to the restoration of any operated relay thereof upon the consequent failure of the flow of holding current.

5. In combination, a signal line; a sending device operable to transmit a number over said line, to repeat such transmission an indefinite number of times, and to introduce a spacing interval immediately following each such transmission preceding the last; recording means operable to predetermine the number to be transmitted, means for starting the sending device into its said operation and for locking the recording means in operated condition, means subsequently operable during or following a transmission interval to unlock and restore the recording means and for terminating the operation of the sending device, and means controlled by said sending device for preventing restoration of the recording means and termination of the operation of the sending device from occurring during any concerned transmission interval, whereby mutilation of the final transmission of the number is prevented.

6. In combination, an impulse-counting device including a train of counting relays operable in successive cycles, means for generating a continuous train of uniformly spaced impulses throughout a plurality of said cycles, concerned ones of said relays operating successively during any said cycle responsive respectively to successive ones of said impulses; means controlled by said relays for locking operated each newly operated relay preceding the final relay operated during the current cycle, and means controlled by each counting relay after the first-operated one for restoring the immediately preceding counting relay; preadjustable recording devices; means effective as the counting device executes its cycles successively for placing it under the control of said recording devices successively; and means for causing the number of counting relays which operate successively during any such cycle to depend on the adjustment of the recording device with which the counting device is currently associated, and for insuring that the final counting relay operated during such cycle restores directly responsive to the end of its operating impulse to terminate the cycle.

7. In combination, a signal line, a sending device operable in successive cycles to transmit respectively corresponding series of uniformly spaced impulses to the signal line, and means for causing the sending device to delay the start of the series of impulses delivered during any cycle of operations thereof, following the beginning of such cycle, by an interval equal to the interval occurring between the beginning of one impulse of a series and the beginning of the next succeeding impulse thereof.

8. In combination, a signal line, a sending device operable in a series of cycles to transmit a series of uniformly spaced impulses to the signal line during each cycle, and means for causing the sending device to delay the start of the series of impulses delivered during any cycle of operations thereof, following the beginning of such cycle, by an interval not less than, and bearing a fixed relation to, the interval occurring between the beginning of one impulse of a series and the beginning of the next succeeding impulse thereof.

9. In a combination as set forth in claim 8, means for causing the sending device to begin each new cycle of said series at the end of an intercycle interval which, when measured from the beginning of the final impulse of the immediately preceding cycle, is equal to the interval occurring between the beginning of one impulse of a series and the beginning of the next succeeding impulse thereof.

10. In combination, a signal line; a counting device having a normal position and having a plurality of off-normal positions, said counting device being arranged to perform in successive cycles in each of which it operates from its normal position to assume a desired number of its off-normal positions successively; means controlled by the counting device during each of a plurality of successive cycles for delivering an impulse to the signal line for each assumed one of a plurality of successive off-normal positions which it may assume, and for insuring that no such impulse is delivered to the signal line for the normal position and for the first off-normal position; recording devices, each adjustable according to any one of the last said plurality of off-normal positions; means for placing the counting device under the control of the recording devices successively as the counting device performs its successive cycles of operations, and means for causing the counting device to return to its normal position, to terminate any said cycle of operations, directly from the one of its off-normal positions which corresponds to the adjustment of the recording device currently controlling it, without its first assuming any succeeding off-normal position.

11. In combination, a signal line; a counting device having a normal position and having a plurality of off-normal positions, said counting device being arranged to perform in successive cycles in each of which it operates from its normal position to assume a desired number of its off-normal positions successively and restores to its normal position from a fixed off-normal position; means controlled by the counting device during each of a plurality of successive cycles for delivering an impulse to the signal line for each off-normal position assumed of a plurality of successive off-normal positions which it may assume and for insuring that no such impulse is delivered to the signal line for the normal position and for the last off-normal position assumed prior to its resumption of normal position; recording devices each adjustable according to any one of the last said plurality of off-normal positions, means for placing the counting device under the control of the recording devices successively as the counting device performs its successive cycles of operations, and means for causing the counting device to pass from its normal position, to start any said cycle of operations, directly to the one of its off-normal positions which corresponds to the adjustment of the recording device currently controlling it, without its first assuming any preceding off-normal position.

12. In combination, a sending device operable to generate and count series of impulses representative respectively of digits in a called number, a signal line over which the sending device transmits such impulses, means for causing said sending device to similarly generate and count a blank digit series of impulses preparatory to any number transmission, and transmission-cancelling means preventing generated and counted blank digit series of impulses from reaching the signal line.

ORLANDO BLYHOLDER.

REFERENCES CITED

The following references are of record in the file of this patent:

UNITED STATES PATENTS

| Number | Name | Date |
|---|---|---|
| 1,237,234 | Beach et al. | Aug. 14, 1917 |
| 1,237,320 | Fox | Aug. 21, 1917 |
| 1,248,749 | Suren | Dec. 4, 1917 |
| 1,264,517 | Heriuk | Apr. 30, 1918 |
| 1,687,045 | Suren | Oct. 9, 1928 |
| 1,714,302 | Fisher | May 21, 1929 |
| 1,809,020 | Burdick | June 9, 1931 |
| 1,812,173 | Sackman | June 30, 1931 |
| 1,823,586 | Burdick | Sept. 15, 1931 |
| 2,042,869 | Smith | June 2, 1936 |
| 2,116,372 | Weld | May 3, 1938 |
| 2,172,596 | Saunders | Sept. 12, 1938 |
| 2,225,680 | Boswau | Dec. 24, 1940 |
| 2,248,819 | Haselton | July 8, 1941 |
| 2,311,455 | Muetherfey | Feb. 16, 1943 |